Figure 1:
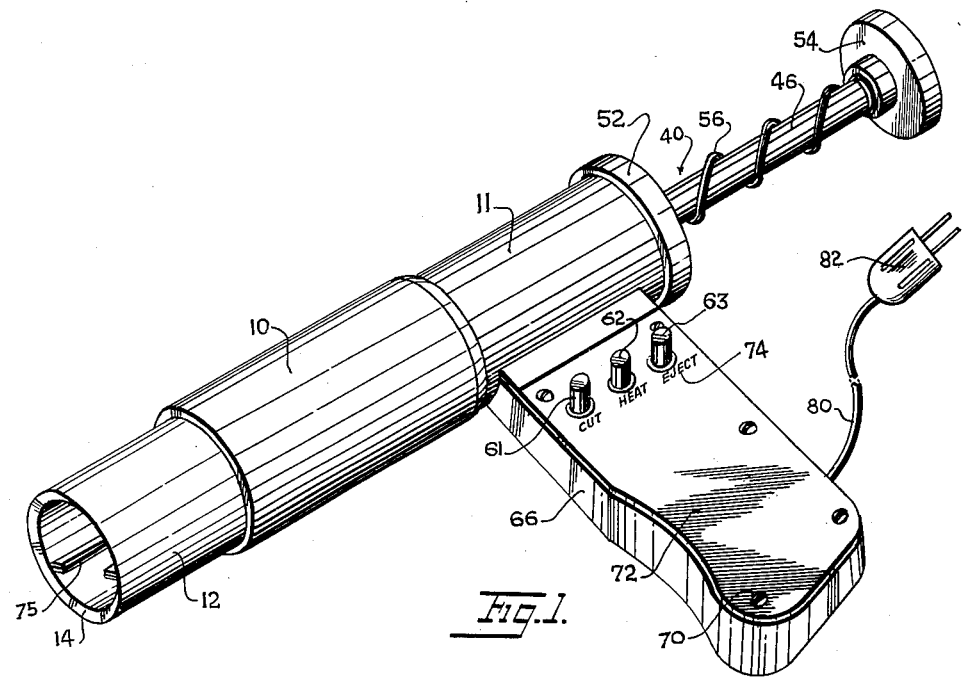

INVENTOR.
LAWRENCE N. LEA
ATTORNEY

Oct. 24, 1961 — L. N. LEA — 3,005,421
HIGH FREQUENCY ICE CREAM DISPENSER GUN DEVICE
Filed Oct. 29, 1959 — 2 Sheets-Sheet 2
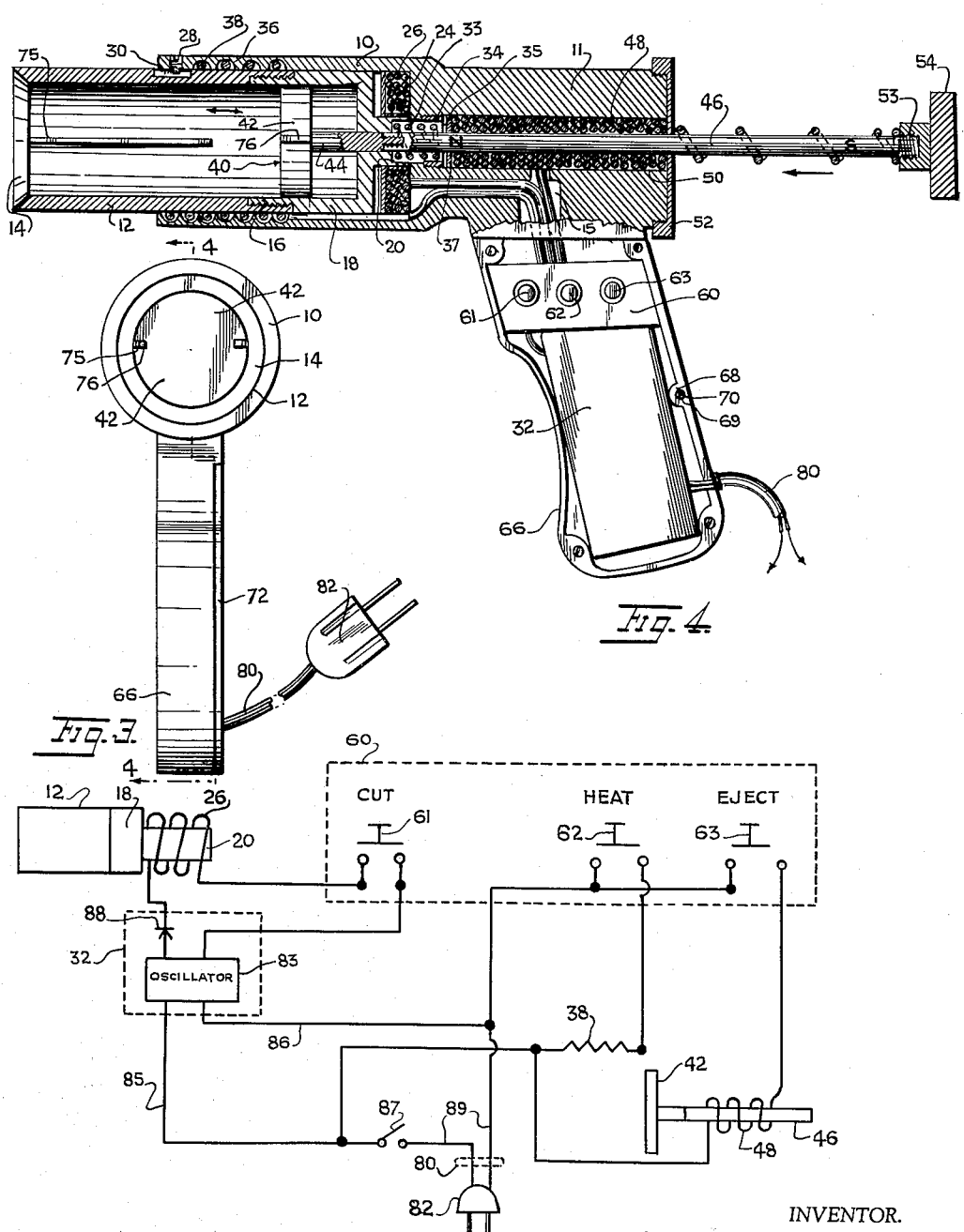
INVENTOR.
LAWRENCE N. LEA
BY
ATTORNEY

United States Patent Office 3,005,421
Patented Oct. 24, 1961

3,005,421
HIGH FREQUENCY ICE CREAM DISPENSER GUN DEVICE
Lawrence N. Lea, 1683 University Ave., Bronx, N.Y.
Filed Oct. 29, 1959, Ser. No. 849,522
4 Claims. (Cl. 107—48)

This invention relates to a food handling implement and more particularly to an implement for cutting, forming and dispensing quantities of foods in hard frozen form such as ice cream, custard, sherbet, butter, chopped meat and the like.

The dispensing of frozen and chilled foods such as ice cream and the like has heretofore presented many difficulties to countermen at soda fountains, ice cream bars and similar establishment because conventional ice cream scoops have been so constructed that they are not readily inserted into tightly packed hard frozen ice cream. It has necessitated repeated scraping and digging in a strained and awkward position for the person dispensing the frozen product. Irregularly shaped masses of the frozen food product are thus broken away causing considerable waste and making proper control of the sizes of portions dispensed impossible. It has been proposed to provide ice cream scoops with heating elements to melt and loosen the product. This expedient has had limited success because it involves inserting a heated implement into a frozen food product. Portions of the product not dispensed are heated and melted which is not desirable. Also, heating of the product to be dispensed frequently causes a change in flavor which is not acceptable to the consumer.

The present invention is directed at overcoming the above mentioned and other difficulties and in addition provides many advantages in an implement of this character.

According to the present invention there is provided an implement which is inserted into a body of frozen product to dispense a portion therefrom. The implement includes a cutting tool which is electromechanically vibrated. The frozen food product is cut and a portion enters a chamber in the tool. By twisting the implement the cut portion is released from the remaining body of the frozen food product. The implement includes a plunger which is electromagnetically operated to eject the cut portion of the food product. The plunger is so arranged that it can also be manually operated if required. Heating means may be included in the implement for heating the tool to expand if from the frozen portion of food product in the tool. Since the metal of the tool is highly conductive of heat it will expand quickly before the frozen product, which is a poor conductor of heat, can melt. The expansion of the tool will facilitate release of the portion of the frozen product therefrom.

It is therefore a principal object of the invention to provide an electrically operated dispensing device for a hard food product, the device including an electromechanically vibrated cutting tool for cutting a portion of the product.

It is a further object to provide an electrically operated dispensing device for a frozen food product, the device including an electromechanically vibrated cutting tool for cutting a portion of the product and an electromagnetically operated plunger for discharging the cut portion from the device.

It is a further object to provide a device of the character described and further including electrically operated heating means for expanding the tool to facilitate release of the cut portion of frozen food product from the device.

Another object is to provide an electrically operated dispensing gun for hard frozen food products.

For further comprehension of the invention, and of the objects and advantages thereof, reference will be had to the following description and accompanying drawings, and to the appended claims in which the various novel features of the invention are more particularly set forth.

Figure 2:
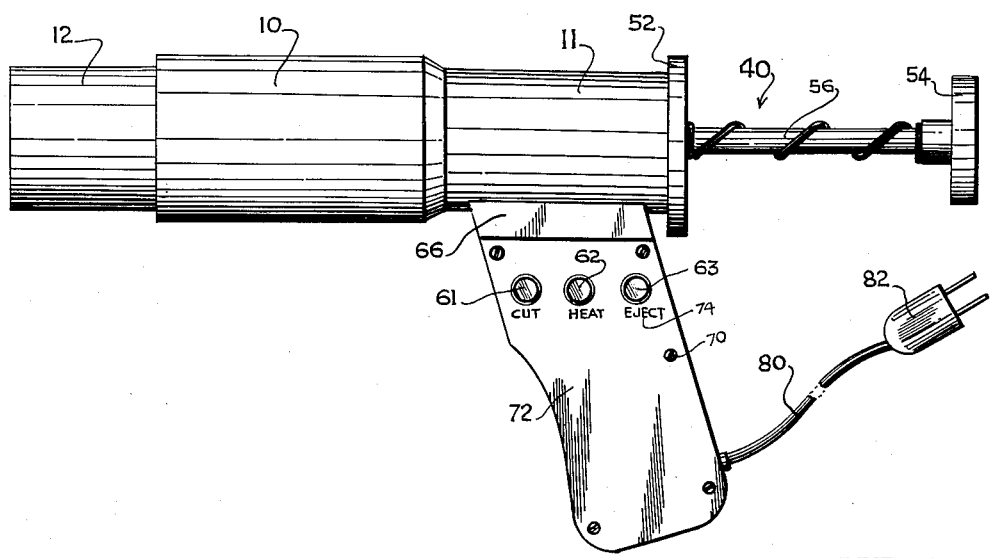

In the accompanying drawings forming a material part of this disclosure:
FIG. 1 is a perspective view of a device embodying the invention.
FIG. 2 is a side elevational view of the device.
FIG. 3 is an end elevational view of the device.
FIG. 4 is a sectional view taken on line 4—4 of FIG. 3.
FIG. 5 is a diagram illustrating the electrical circuit of the device.

Referring to FIGS. 1-4 there is shown a generally cylindrical barrel 10 having a cylindrical cavity in which is slidably fitted a cylindrical tool 12. The tool has a beveled cutting edge 14 at its outer free end. At its other end the tool is threaded upon a forwardly extending flange 16 of a cup-shaped magnetic driving member 18. Member 18 has a rearwardly extending nipple 20 slidably fitted in a cylindrical passage defined by an annular ring 24. Ring 24 serves as a retainer base element for a coil 26 and is retained at the base of the cavity of barrel 10. A pin 28 is threaded in a hole in barrel 10 at its forward end and extends radially into a short groove 30 formed in tool 12 as best shown in FIG. 4. The tool and attached driving member 18 are vibratable axially a very short distance of the order of 0.1 of an inch or less. Member 18 is driven when the coil 26 is electrically energized.

A coil spring 33 threaded in nipple 20 is connected to a fixed plug 34 by engaging a slot therein. Since the spring 33 is fixed at both ends, it can bias, the tool 12 and member 18 in opposition to the resulting movement in response to pulses applied to coil 26. Accordingly, when the coil is pulsed, the tool is urged in one direction and during the intervals between pulses the spring 33 returns the tool. Pin 28 permits axial vibration of the tool while preventing turning of the tool in the barrel 10. Plug 34 is externally threaded for being fixed in the inner end of a bore 50 in the barrel.

A spiral groove 36 is formed in the barrel 10. In this groove is seated a coil 38 of resistance or heater wire. A plunger 40 having a head 42 in the form of a circular disk is axially slidable in the member 18 and tool 12. This disk has an axial stub shaft 44 secured to a drive shaft 46 formed as a cylindrical bar magnet. A coil 48 surrounds the shaft which passes axially through bore 50 in the barrel. Washer 37 spaces plug 34 and coil 48. The rear end 11 of the barrel 10 is externally threaded and is closed by a threaded cap 52 through which the shaft 46 passes axially. The shaft terminates in a threaded bore 53 of a knob 54. A coil spring 56 is disposed on the shaft 46 between the knob 54 and the cap 52 and tends to retract the shaft from the barrel, i.e. to the right as viewed in FIGS. 1, 2 and 4.

A push button switch assembly 60 including three push buttons 61, 62 and 63 is disposed in a cavity 64 of a handle 66 integrally formed with barrel 10. Also disposed in the cavity 64 is a pulsing circuit assembly 32 which energizes the coil 26 periodically.

Bosses 68 are formed at the inner walls of the cavity 64. These bosses have threaded holes 69 to receive screws 70 which removably secure a cover plate 72 to the handle. On plate 72 are marked legends 74 indicating the function of each of the push buttons 61—63.

Within tool 12 are mounted radially inwardly extending diametrally opposed blades 75. These blades extend longitudinally inwardly from the beveled end of the tool. Radial slots 76 are provided in the periphery of head 42 for clearing the blades when the plunger is advanced forwardly axially to the beveled end 14 of the device. A cable 80 having a terminal plug 82 is connected to the handle for providing electric power to the device.

Coils 26, 38, 48 are electrically connected in circuit with the switch assembly 60 and with the pulsing circuit 32, as best shown in FIGS. 4 and 5, to which reference is now made. Passages 15 are formed in the rear end 11 of the barrel through which pass the several insulated wires from the coils to the switch assembly and pulsing circuit. As shown in FIG. 5, the pulsing circuit is connected by wires 85, 86 to an electrical oscillator or signal generator 83 which is energized via wires 85, 86 from a suitable power source to which the plug 82 will be connected. A switch 87 may be disposed in the power supply circuit 89 for turning the power on and off conveniently. When switch 87 is closed the generator or oscillator 83 is energized. This may be a conventional type of electrical oscillator for generating alternating current at any frequency, preferably in the range of 20,000 to 100,000 cycles per second.

A conventional rectifier 88 is in series with the output of the oscillator for converting the alternating current to unipolar pulses at the frequency of the generated wave from oscillator 83. The unipolar pulses are applied to coil 26 via push button switch 61 when this normally open switch is closed. When switch 61 is closed coil 26 is energized periodically at a high frequency determined by the frequency of the oscillator 83. Each time the coil 26 is pulsed or energized it moves the magnetic member 18 and tool 12 in one direction electromagnetically determined by the direction of current flow. Spring 33 returns the magnetic member and tool between electrical pulses applied to the coil.

Resistance wire 38 is in series with switch 62, which is normally open, and with the power supply wires 89. When switch 62 is closed the resistance wire 38 is energized and heats up the barrel 10 and tool 12.

Coil 48 surrounding the magnetic shaft 46 is in series with the normally open push button switch 63 and with the power supply wires 89.

In operation of the device, the person dispensing the frozen food product such as ice cream, butter, ground meat, or the like, will grasp the handle 66 and place the beveled edge 14 against a body of the food product. When button 61 is pressed by the user's thumb, the coil 26 will be electrically pulsed and the tool will be vibrated since it is joined to and driven by the magnetic member 18. Due to the high frequency of vibration the tool will be driven very rapidly into the body of the food product cutting a cylindrical portion thereof without requiring the user to exert any greater force than is required to guide the direction of the cut. When button 61 is released, cutting stops. The user will then twist the implement so that the cut portion is broken away from the body of the food product.

The user will now press button 63 whereupon the coil 48 will become energized and the plunger shaft 46 will be driven forward so that the head 42 pushes the cylindrical portion of food out of the cylindrical cavity in the tool. If the tool 12 is made of metal it will sometimes be found that it contracts due to extreme cold of the frozen food portion held therein, so that the food portion becomes jammed in the tool. This condition can be overcome by manually pushing the knob 54 forward to assist the coil 48 in advancing the shaft 46. If the tool 12 is made of plastic material which is a poor heat conductor, such manual assistance of the electromagnet 46, 48 will rarely be required because the tool will not contract excessively.

Instead of manually assisting the electromagnet 46, 48 to operate the plunger, recourse may be had to the heater operated by button 62 if tool 12 is made of a good heat conductor such as metal. If the button 62 is pressed, the tool will become heated and will expand. Normally sufficient expansion will occur to permit the electromagnet 46, 48 to eject the frozen food portion in a very short time interval which is too short to melt the frozen food product. The user will press buttons 62, 63 simultaneously to effect this cooperative release and ejection of the frozen food portion. Recourse will normally be had to the manual advancement of the plunger 40 only as a last resort if a food product becomes jammed in the tool and cannot be released by the electrical controls. Of course it is possible for the user simultaneously to press buttons 62 and 63 and also press the knob 54 manually with his free hand. This threefold cooperative effort will always effectively release the frozen food portion from the tool without delay.

If the tool 12 is made of a poor heat conductor such as plastic material, the heater coil 38 and switch 62 may be omitted from the device.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. An implement for dispensing a frozen food product, comprising a tubular support having an open end, a cylindrical tubular cutting tool axially disposed in said support and movable through said open end, first electromechanical means for vibrating the tool to cut into a body of said frozen food product to form a cylindrical portion thereof in said tool, a plunger disposed and movable axially in said tool having a magnetic shaft operatively connected thereto for advancing the same to eject said portion of frozen food product from the tool, electromagnetic means for advancing the shaft and plunger, said support having a handle, switch means carried by said handle, said switch means being in circuit with said electromechanical means and said electromagnetic means for actuating the same, said electromechanical means including a pulsating circuit, said circuit comprising a generator of high frequency alternating current, a rectifier for converting said alternating current into unipolar periodically interrupted pulses, a coil receiving said pulses, and a magnetic member movable by said coil when the coil is pulsed; and spring means for retracting said magnetic member between said pulses, whereby said member is vibrated.

2. An implement for dispensing a frozen food product, comprising a tubular support having an open end, a cylindrical tubular cutting tool axially disposed in said support and movable through said open end, first electromechanical means for vibrating the tool to cut into a body of said frozen food product to form a cylindrical portion thereof in said tool, a plunger disposed and movable axially in said tool having a magnetic shaft operatively connected thereto for advancing the same to eject said portion of frozen food product from the tool, electromagnetic means for advancing the shaft and plunger, said support having a handle, switch means carried by said handle, said switch means being in circuit with said electromechanical means and said electromagnetic means for actuating the same, said electromechanical means including a pulsating circuit, said circuit comprising a generator of high frequency alternating current, a rectifier for converting said alternating current into unipolar periodically interrupted pulses, a coil receiving said pulses, and a magnetic member movable by said coil when the coil is pulsed; and spring means for retracting said magnetic member between said pulses, whereby said member is vibrated, said tool being connected to said member and vibratable thereby.

3. An implement for dispensing a frozen food product, comprising a tubular support having an open end, a cylindrical tubular cutting tool axially disposed in said support and movable through said open end, first electromechanical means for vibrating the tool to cut into a body of said frozen food product to form a cylindrical portion thereof in said tool, a plunger disposed and movable axially in said tool having a magnetic shaft operatively connected thereto for advancing the same to eject said portion of frozen food product from the tool, electromagnetic means for advancing the shaft and plunger, said support having a handle, switch means carried by said handle, said switch means being in circuit with said electromechanical means and said electromagnetic means for actuating the same, said electromechanical means including a pulsating circuit, said circuit comprising a generator of high frequency alternating current, a rectifier for converting said alternating current into unipolar periodically interrupted pulses, a coil receiving said pulses, and a magnetic member movable by said coil when the coil is pulsed; and spring means for retracting said magnetic member between said pulses, whereby said member is vibrated, said tool being connected to said member and vibratable thereby, said shaft extending axially out of said support with a knob fixed thereto for manually assisting said electromagnetic means in advancing the shaft and plunger.

4. An implement for dispensing a frozen food product, comprising a tubular support having an open end, a cylindrical tubular cutting tool axially disposed in said support and movable through said open end, first electromechanical means for vibrating the tool to cut into a body of said frozen food product to form a cylindrical portion thereof in said tool, a plunger disposed and movable axially in said tool having a magnetic shaft operatively connected thereto for advancing the same to eject said portion of frozen food product from the tool, electromagnetic means for advancing the shaft and plunger, said support having a handle, switch means carried by said handle and in circuit with said electromechanical means and said electromagnetic means for actuating the same, said electromechanical means including a pulsating circuit, said circuit comprising a generator of high frequency alternating current, a rectifier for converting said alternating current into unipolar periodically interrupted pulses, a coil receiving said pulses, and a magnetic member movable by said coil when the coil is pulsed; spring means for retracting said magnetic member between said pulses, whereby said member is vibrated, said tool being connected to said member and vibratable thereby, said shaft extending axially out of said support with a knob fixed thereto for manually assisting said electromagnetic means in advancing the shaft and plunger, electrical heater means surrounding the tool for heating and expanding the same to assist said electromagnetic means in ejecting said portion of frozen food product from the tool, and further switch means carried by said handle for actuating the heater means.

References Cited in the file of this patent

UNITED STATES PATENTS

| | | |
|---|---|---|
| 2,591,516 | Darnell | Apr. 1, 1952 |
| 2,621,614 | Walling | Dec. 16, 1952 |
| 2,859,325 | Lea | Nov. 4, 1958 |

FOREIGN PATENTS

| | | |
|---|---|---|
| 564,803 | Canada | Oct. 4, 1958 |